March 7, 1967 J. E. CONROY ET AL 3,307,915
APPARATUS FOR CONTINUOUS CALCINATION OF GYPSUM
Filed Jan. 22, 1964

INVENTORS
Joseph E. Conroy, Jr.
J. Sparland Jorgenson
BY
Synnestvedt & Lechner
ATTORNEY

United States Patent Office 3,307,915
Patented Mar. 7, 1967

3,307,915
APPARATUS FOR CONTINUOUS CALCINATION OF GYPSUM
Joseph E. Conroy, Jr., Media, Pa., and J. Sharland Jorgensen, Marysville, Kans., assignors, by mesne assignments, to Georgia Pacific Corporation, Portland, Oreg., a corporation of Georgia
Filed Jan. 22, 1964. Ser. No. 339,390
5 Claims. (Cl. 23—277)

This invention relates to an improved method and apparatus for the calcination of hydrated solid materials and more particularly to a method and apparatus for the continuous calcination of gypsum.

By far the largest portion of calcined gypsum produced today is made in kettle type reactors by the so-called batch process. From an economic standpoint, batch production methods are inherently inefficient. Both fuel and time are wasted in successively charging the kettles with raw gypsum, heating each charge until the mass is completely calcined, then discharging the kettles and repeating the operation a number of times to make up the day's production. Moreover, if the kettle temperature is not kept at or near the calcining temperature in between batches, the time to heat each batch of gypsum becomes excessive. Over long periods of time, fuel consumption during this non-productive time becomes quite substantial.

In order to improve the efficiency of the calcination process, attempts have been made in the past to calcine by a continuous technique, as distinguished from a batch type procedure; that is, by continuously feeding raw gypsum into a reactor and continuously drawing out the calcined product.

While industry has long recognized the need to convert to continuous operation, prior art attempts have not gained wide acceptance for a variety of reasons. In many instances, the apparatuses and methods developed have involved such radical departures from the prior art that present equipment cannot be practically modified to carry out the new techniques. Although the need has been great, a satisfactory method of converting existing equipment in a manner consistent with the economical production of high quality stucco, is not, to our knowledge available to the industry. Since by far the largest portion of calcined gypsum presently produced is made in batch type kettles, the ability to continuously produce calcined gypsum of superior quality by modifying such equipment, is of great importance.

With the above in view, it is an object of this invention to provide a method and apparatus for continuously calcining gypsum of a uniform high quality.

It is a further object of this invention to provide simple and efficient means for modifying existing batch type reactors so that they can operate on a continuous basis.

Another object is to provide kettle apparatus which can be operated to yield substantial increases in production with lower fuel, maintenance, and manpower costs.

How the foregoing and various other objects of this invention are achieved will be explained more fully hereinafter in the following detailed description and in the accompanying drawings in which.

Figures 1, 2:
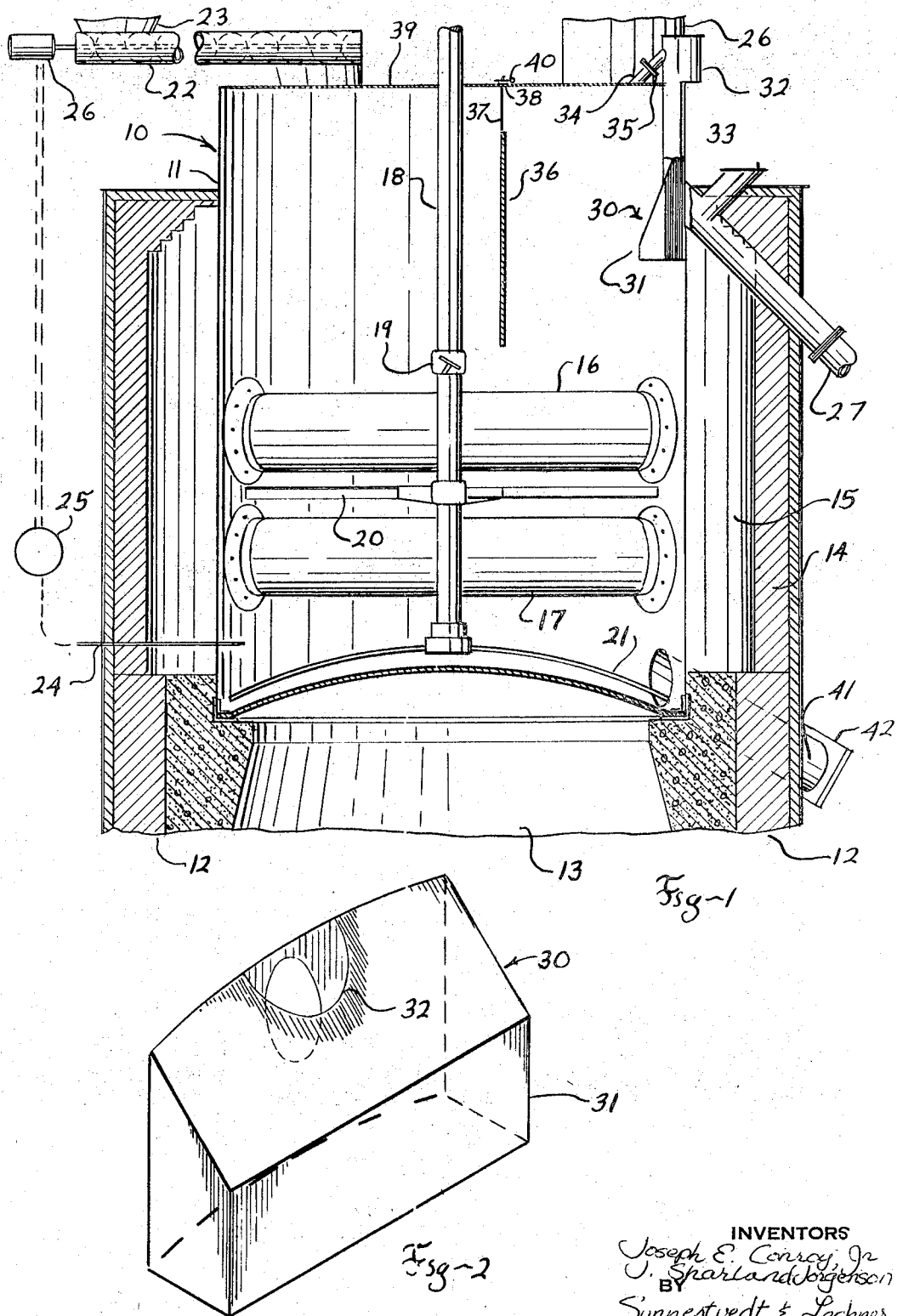
FIGURE 1 is a sectional view showing a kettle formed in accordance with the present invention.
FIGURE 2 is a perspective view showing the hood which encloses the outlet from the kettle.

Turning now to a detailed description of the invention, the reactor 10, shown in FIGURE 1, is a conventional kettle type reactor modified in accordance with one form of the present invention to carry out calcination by our improved continuous method. In order to give a clearer understanding of the present invention, the conventional aspects of this kettle type reactor will first be briefly described.

The kettle 10 is generally cylindrical in shape, having walls 11, and is preferably constructed of welded steel plate. Walls 12 enclose the usual fire box 13 for heating the mass of material fed into the kettle. A coal, gas or oil fed fire is maintained within the fire box 13 and, in the illustrative embodiment of this invention, the fire supplies heat to the kettle at a substantially uniform rate.

Annular walls 14, conventionally constructed of brick, extend upwardly around the walls of kettle 10. These walls 14 are spaced from the kettle a suitable distance in order to form an annular chamber 15 to permit a circulation of hot flue gases around the kettle. Flues 16 and 17 extend through the kettle in order to circulate the hot gases through the center of the mass of gypsum. Directing baffles, not shown, are generally provided within the annular chamber 15 in order to direct the gases through the flues 16 and 17. The temperature of the gases within the fire box 13, chamber 15 and flues 16 and 17 is maintained at a sufficiently high level to properly calcine the mass.

Means are provided for agitating the calcining gypsum, consisting of a shaft 18 mounted for rotation within the kettle. Agitators or stirring paddles 19, 20 and a bottom scraper 21 are attached to the shaft at spaced intervals. The shaft is preferably constantly rotated to promote uniform heating of the mass of gypsum in the kettle.

A conveyor 22 is used to transfer ground gypsum from a hopper or storage bin 23 to the kettle and in the illustrative embodiment of the invention, this conveyor feeds the material directly into the top of the kettle adjacent one side thereof. Conveyor 22 is diagrammatically shown as a screw type conveyor in FIGURE 1. However, other types of conveyors or chutes, having a controllable rate of feed, obviously may be employed. A temperature controller including a thermostatic element 24 extends into the kettle at a point near the bottom. Thermostatic element 24 is interconnected with a controller unit diagrammatically illustrated at 25. Controller unit 25 regulates the conveyor drive means 26 to vary the rate of feed of the conveyor 22 in response to changes in temperature within the kettle. As the temperature of the mass exceeds a predetermined point, about 325° F. in preferred practice, the rate of feed is increased in relation to the temperature rise. Similarly the speed is decreased as the temperature drops below the predetermined temperature for proper calcination.

In order to provide for continuous discharge of the calcined material, an overflow discharge pipe 27 extends downwardly and outwardly from a point near the top of the kettle to the conventional receiving bin or hot pit. The discharge pipe is preferably located away or structurally remote from the point at which gypsum is fed into the kettle to prevent the direct flow and discharge of uncalcined material.

In accordance with conventional practice, these kettles ar usually provided with a ventilating means including a hood 26, leading to an exhaust fan, not shown, to draw off the dust and the steam arising from the process. While such an arrangement is necessary in practice, the draft so created will cause an objectionable flow of cool air up through the discharge spout, which, if unchecked, would tend to cause packing of the material which might lead to complete stoppage of the flow to the hot pit. Moreover, air flow up through the pipe tends to pick up dust as it passes over the fine particles of calcined stucco, thereby increasing the dust load on the exhaust system.

To prevent this, means are provided to isolate the opening to the discharge pipe from the area of negative pressure created by the exhaust means at least to an extent which substantially limits air flow therethrough. One such means, shown in FIGURE 2, is an enclosure or cover for the discharge pipe opening. In FIGURE 2, this covering comprises a shroud or hood 30. Walls 31 of the hood extend a short distance below the surface of the gypsum thus effecting substantial sealing of the opening from the effects of the draft. The hood is open at the bottom to permit the free flow of calcined material out of the kettle.

While a substantial flow of air within the discharge pipe must be prevented, we have found that it is desirable to create a slight draft therein, to draw off any steam or dust that might accumulate within the hood 30. To do this, the top of the hood 30 may be provided with an opening 32 to which a section of a pipe 33 is connected. This pipe section may be secured to the side wall by welding and extends upwardly from the opening to a point slightly above the top of the kettle. A relatively small capacity vent, including an inclined vent pipe 34, leads from the pipe section down into the area of negative pressure at the top of the kettle. A valve 35 is preferably provided in the vent pipe 34. The valve 35 is opened as required to allow any accumulated steam and dust to escape from the hood and discharge pipe.

Further assurance that the discharge opening is structurally remote from the feed means may be provided by extending the hood walls to a point beneath the level of the material in the kettle. However, the depth to which the walls can extend below the level is limited, as a practical matter, since, as soon as the stucco within the hood becomes isolated from the action of the agitators, it tends to densify and to impede the discharge. Therefore, to avoid this tendency of the material in the hood to clog the discharge opening, we terminate the hood a short distance below the level of the overflow. To prevent significant migration of uncalcined particles to the hot pit we install a baffle plate 36 intermediate the feed section and the discharge pipe. In the preferred embodiment of the invention, plate 36 extends about one third of the way into the mass and terminates just short of the upper stirring paddle 19. Plate 36 may be welded or bolted to the kettle side walls in conventional manner and is preferably provided with safety rods or bolts 37 which project through openings 38 in plate 39 which covers the top of the kettle. Pins 40 pass through the rods 37 and bear against the upper surface of the plate 39. The arrangement assures that if the baffle breaks loose from the walls of the kettle, it will remain in place so as not to damage the flues and stirring paddles. If desired, the baffle may be adjustably mounted with the kettle.

In operation, at the start of a run, the kettle is filled, preferably to about one quarter full in the conventional manner. Heat from the fire raises the temperature of the mass, effecting calcination. When the initial mass of gypsum reaches about 300° F., the temperature controlled feed system is turned on, feeding gypsum at a rate which maintains the mass at the desired calcining temperature, usually at about 325° F. As the particles are calcined they give up their water of crystallization and hence migrate to the top of the mass and pass out through the overflow spout 27. When the kettle is shut down the remaining material is discharged through a conventional discharge chute 41 having a valve 42 at the bottom of the kettle. Baffle 36 prevents the direct migration of uncalcined particles from the point at which they are fed into the kettle directly to the discharge pipe. In addition the shroud or hood 30 prevents packing and clogging of the discharge pipe by limiting the strong upward draft which otherwise would be created at this point.

The present invention provides a remarkably simple and efficient means for calcining large amounts of gypsum. The process can be operated for long periods of time thereby yielding substantially continuous operation.

We claim:

1. In apparatus for the continuous calcination of gypsum and like materials in a kettle type reactor having a source of heat for calcining raw material within the kettle, a flue system including a wall surrounding the kettle and spaced therefrom to form an annular chamber for circulating hot gases around the kettle wall, and ventilator means creating a draft at the top of the kettle to draw off steam and dust, the combination comprising: conveyor means terminating in an outlet at the top of the kettle for continuously feeding raw material into the kettle; control means for maintaining the temperature of the raw material in the kettle within a predetermined temperature range; an opening in the kettle side wall near the top thereof; a discharge spout leading away from said opening, said opening being structurally remote from the incoming raw material; a vertically disposed baffle plate within the kettle, said plate intersecting the said kettle side wall at points intermediate the conveyor outlet and the discharge opening, and extending into the mass of material whereby to block the migration of uncalcined material to the discharge opening; and means mounting the baffle plate for vertical movement within the kettle whereby the depth of penetration of the plate into the mass may be adjusted.

2. In apparatus for the continuous calcination of gypsum and like materials in a kettle type reactor having a source of heat for calcining raw material within the kettle, a flue system including a wall surrounding the kettle and space therefrom to form an annular chamber for circulating hot gases around the kettle wall, and ventilator means creating a draft at the top of the kettle to draw off steam and dust, the combination comprising: conveyor means terminating in an outlet at the top of the kettle for continuously feeding raw material into the kettle; control means for maintaining the temperature of the raw material in the kettle within a predetermined temperature range; an opening in the kettle side wall near the top thereof; a discharge spout leading downwardly and outwardly away from said opening, said opening being structurally remote from the incoming raw material; a vertically disposed baffle plate within the kettle; said plate intersecting the said kettle side wall at points intermediate the conveyor outlet and the discharge opening, and extending into the mass of material whereby to block the migration of uncalcined material to the discharge opening; said shroud having downwardly extending side walls terminating in an opening, said opening being located in the upper region of the kettle and beneath the discharge opening.

3. Apparatus according to claim 2 further including means mounting the baffle plate for vertical movement within the kettle whereby the depth of penetration of the plate into the mass may be adjusted.

4. In apparatus for the continuous calcination of gypsum and like materials in a kettle type reactor having a source of heat for calcining raw material within the kettle, a flue system including a wall surrounding the kettle and spaced therefrom to form an annular chamber for circulating hot gases around the kettle wall, and ventilator means creating a draft at the top of the kettle to draw off steam and dust, the combination comprising: conveyor means terminating in an outlet at the top of the kettle for continuously feeding raw material into the kettle; control means for maintaining the temperature of the raw material in the kettle within a predetermined temperature range; an opening in the kettle side wall near the top thereof; a discharge spout leading downwardly and outwardly away from said opening, said opening being structurally remote from the incoming raw material; a baffle extending into the mass intermediate the conveyor outlet and the discharge opening; and a shroud within the kettle covering said discharge opening, said shroud having downwardly extending side walls terminating in an opening, said opening being located in the upper region of the kettle and beneath the discharge opening.

5. Apparatus according to claim 4 including a relatively small capacity vent in the discharge shroud, said vent interconnecting the interior of the shroud with the ventilating means.

References Cited by the Examiner
UNITED STATES PATENTS

| | | | |
|---|---|---|---|
| 2,290,805 | 7/1942 | Gottschalk et al. | 263—53 X |
| 2,586,818 | 2/1952 | Harms. | |
| 3,236,509 | 2/1966 | Blair | 263—21 |

MORRIS O. WOLK, *Primary Examiner.*

JAMES H. TAYMAN, JR., *Examiner.*